United States Patent [19]
Maree et al.

[11] Patent Number: 5,156,746
[45] Date of Patent: Oct. 20, 1992

[54] TREATMENT OF WATER

[75] Inventors: Johannes P. Maree, Pretoria; John A. Clayton, Mowbray, both of South Africa

[73] Assignee: CSIR, Pretoria, South Africa

[21] Appl. No.: 732,828

[22] Filed: Jul. 19, 1991

[30] Foreign Application Priority Data

Jul. 20, 1990 [ZA] South Africa .............. 90/5730

[51] Int. Cl.$^5$ .............. C02F 1/58; C02F 1/64
[52] U.S. Cl. .................. 210/712; 210/715; 210/717; 210/722; 210/724; 210/912
[58] Field of Search .............. 210/712, 713, 714, 715, 210/724, 912, 722, 717; 423/555, 166, 169

[56] References Cited

U.S. PATENT DOCUMENTS

| | | | |
|---|---|---|---|
| 1,310,382 | 7/1919 | Auld et al. | 423/555 |
| 1,765,424 | 6/1930 | Hageman et al. | 210/696 |
| 3,617,560 | 11/1971 | Deul | 423/555 |
| 3,855,125 | 12/1974 | Lin | 210/714 |
| 3,929,416 | 12/1975 | Tanaka et al. | 423/555 |
| 4,208,393 | 6/1980 | LeBel | 423/555 |
| 4,764,284 | 8/1988 | Jansen | 210/715 |
| 4,861,493 | 8/1989 | Jansen | 210/715 |

FOREIGN PATENT DOCUMENTS

| | | | |
|---|---|---|---|
| 674410 | 12/1965 | Netherlands | 210/714 |
| 8401313 | 11/1985 | Netherlands | 210/714 |

Primary Examiner—Stanley S. Silverman
Assistant Examiner—Neil M. McCarthy
Attorney, Agent, or Firm—Curtis, Morris & Safford

[57] ABSTRACT

A water quality improvement process is provided for acid water containing sulphate and/or sulphite ions. The water is continuously fed into a fluidized bed containing calcium carbonate particles. The water consumes calcium carbonate and has its pH increased while calcium sulphate $CaSO_4$ and/or $CaSO_3$ are produced.

11 Claims, 2 Drawing Sheets

TREATMENT OF WATER

THIS INVENTION relates, broadly, to the treatment of acid water to improve the quality thereof. More particularly, the invention relates to a process for the treatment of water, which may be environmentally undesirable by virtue of its having a low pH, together with a high sulphate ion content and possibly a high heavy metal cation content of metals such as Fe and Mn, so as to improve its environmental acceptability.

According to the invention, there is provided a process for the treatment of acid water containing anions selected from the group consisting of sulphate ions and sulphate ions, to improve the quality thereof, the process being continuous and including the step of feeding said acid water into at least one fluidized bed of particles comprising calcium carbonate, the water fed to each bed passing through the bed where it consumes the calcium carbonate of the particles, which consumption is associated with an increase in the pH of the water, said anions in the water reacting with calcium ions from the calcium carbonate according to a reaction selected from:

$$H_2SO_4 + CaCO_3 \rightarrow H_2O + CaSO_4 + CO_2; \text{ and}$$

$$H_2SO_3 + CaCO_3 \rightarrow H_2O + CaSO_3 + CO_2$$

and a product water being produced with a pH which is higher than that of the acid feed water.

When acid water has a sulphate content above 2000 mg/l, particularly above 2500 mg/l, calcium sulphate may precipitate as gypsum ($CaSO_4 \cdot 2H_2O$) crystals Furthermore, if the acid water has a sulphite ion content which is sufficiently high, calcium sulphite can also precipitate as crystals.

Each bed is thus a fluidized bed, the particles of the bed being fluidized by the water passing therethrough.

If desired, e.g. when a higher rate of water flow up through each fluidized bed is required for fluidizing purposes, than is available in the feed of water to be treated, a proportion of the water which has passed through each bed may be recirculated to the water feed to said bed, being passed therethrough, together with the acid feed water, to assist in fluidizing the bed.

The particles in each bed may be selected from limestone particles, dolomite particles (comprising a proportion of magnesium carbonate) and mixtures thereof. When dolomite is used, the $MgCO_3$ therein will react with any sulphate or sulphite ions to provide some $MgSO_4$ or $MgSO_3$ in solution, i.e. $CaMg(CO_3)_2 + 2H_2SO_4 \rightarrow CaSO_4 + MgSO_4 + 2CO_2 + 2H_2O$ with a similar reaction for any sulphite ions of $CaMg(CO_3)_2 + 2H_2SO_3 \rightarrow CaSO_3 + MgSO_3 + 2CO_2 + 2H_2O$. The $MgSO_3$ is substantially more suluble than the $CaSO_3$ and will remain in solution, providing the useful advantage of separating $CaSO_3$ and $MgSO_3$ for use as potentially valuable by-products. Magnesium is present in the dolomite as part of a minor proportion of $CaMg(CO_3)_2$ mixed with a major proportion of $CaCO_3$. Any $MgSO_4$ which precipitates as crystals will typically form part of any gypsum or calcium sulphite precipitated, but in practice essentially all the $MgSO_4$ remains in solution in the treated water, together with such $MgSO_3$ as is present.

The calcium carbonate inventory in each bed, and the rate at which the water is passed therethrough, will generally be selected so that the water undergoes the desired degree of quality improvement as it passes through the bed.

As the process is continuous, fresh calcium carbonate inventory, may be continuously or at least intermittently fed into the bed, spent inventory, when the calcium carbonate feed is not pure calcium carbonate, being purged from the bed continuously or at least intermittently. In other words, calcium carbonate-containing particles being fed to the bed, at least intermittently, spent particles being purged from the bed, at least intermittently, when calcium carbonate therein has been consumed. The inventory feed may be at or adjacent the top of each fluidized bed, purging of inventory being at or adjacent the bottom of the bed.

Furthermore, if desired, the water being treated may be passed through several said fluidized beds employed in series with regard to water flow, each being operated in similar fashion and being charged with fresh calcium carbonate inventory. Instead, or in addition, spent material purged from the fluidized bed in the series may be charged, intermittently or continuously, into an upstream fluidized bed, e.g. the immediately upstream bed, to consume residual calcium carbonate therein, so that the material finally purged from the series is fully spent and contains substantially no available calcium carbonate. Accordingly, in a particular embodiment, the water being treated may pass through a plurality of fluidized beds arranged in series, fresh particles being fed into the last bed of the series and the spent particles purged from each bed other than the first bed in the series being fed to the preceding bed in the series, the spent particles purged from the first bed in the series containing substantially no calcium carbonate being discarded.

The process of the present invention will, as the water being treated is acid, act at least partially to neutralize and raise the pH thereof. Usually the rate of water feed, bed height and/or hydraulic retention time, may be selected so that water leaving each bed, has, within limits, a desired pH. When each bed is a fluidized bed, the overall rate of inventory feed may be balanced with the rate of water feed, so that a stoichiometric amount of calcium carbonate is fed to the bed or series of beds, sufficient to neutralize the acid in the water being fed therethrough. The water feed rate and/or bed sizes are conveniently such that the water has a total residence time in contact with the calcium carbonate inventory of about 1-3 minutes or more. Preferably such rate is no more than is required reliably to fluidize each bed, the average upflow velocity of the water, based on the empty volume of each fluidized bed (i.e. flow rate in $m^3/hr$ divided by the cross-sectional area of the bed in $m^2$) being 30-40 m/hr, e.g. 36 m/hr.

The neutralization reaction can be expressed by:

$$CaCO_3 + 2H^+ \rightarrow Ca^{2+} + CO_2 + H_2O.$$

As the $CO_2$ produced can dissolve in the water to form carbonic acid, the process is capable of raising the pH of the water to no more than about 5.5-7.6, any further pH increase requiring the addition of CaO, $Ca(OH)_2$, NaOH or the like alkaline material. If desired, $CO_2$ produced in this reaction can be recovered as a by-product.

For each fluidized bed, a particle size for the calcium carbonate inventory may be employed in the broad range of 150-10,000 μm, e.g. 250-600 μm, more specifically 300-420 μm. As the water being treated reacts with the calcium carbonate in each fluidized bed, a size reduction of the calcium carbonate-containing particles takes place, any non-calcium carbonate insoluble residue, depending on its particle size, either being eluted from the bed or purged therefrom. Any gypsum or calcium sulphite will be formed in the form of fine crystals, and the Applicant has found in practice that gypsum crystals can easily be caused, depending on the water flow rate, to separate substantially from the calcium carbonate inventory of each bed (due to the differing settling velocities thereof and slow rate of crystallization of the gypsum), to form an upper fluidized gypsum layer, above a layer of fluidized calcium carbonate inventory in the bed. The same is in principle possible with calcium sulphite crystals. It will be appreciated in this regard that, in each fluidized bed of calcium carbonate particles, there is substantial attrition of the calcium carbonate particles. Any tendency for a coating of calcium sulphite or a layer of gypsum to form thereon is thus counteracted, and the attrition tends to prevent the build-up of any such coating.

Optionally, the water feed rate may be selected such that any gypsum or calcium sulphite crystals are not excessively eluted from each fluidized bed together with the water leaving the bed. In this embodiment, such crystals may be withdrawn from said layer of crystals in each bed and dewatered, the water separated therefrom optionally being returned to the process. Any eluted crystals may be separated, e.g. by settling, which can employ an organic flocculant, followed by filtration, such as ultra-filtration, to form a potential by-product which, however, can, if necessary, by dumped as an environmentally acceptable solid waste product.

In another embodiment, the crystals may be deliberately eluted and then separated from the water, e.g. as described above, between the fluidized beds in the series and after the last fluidized bed in the series. The Applicant has found that, surprisingly, while a portion of any dissolved calcium sulphate formed by reaction of sulphate ions with calcium ions in the inventory precipitates relatively quickly as gypsum crystals which can be withdrawn or eluted from each fluidized bed, a portion thereof is resistant to precipitation as crystals, and remains dissolved. Thus, when gypsum crystals which have been withdrawn or eluted are separated from water by settling, a proportion of the settled crystals may advantageously be recirculated to the settling step to act as seed crystals to promote further precipitation of dissolved calcium sulphate as gypsum. This can be effected in two tanks, namely a first tank in which crystallization of gypsum takes place, and a second tank which acts as a settling tank, into which the first tank discharges, in which gypsum crystals are settled, crystals been recirculated as seed crystals from the second tank to the first tank. Instead, or in addition, the water containing dissolved calcium sulphate can be passed through a fixed or fluidized bed of gypsum crystals whose crystal growth takes place to reduce the concentration of dissolved calcium sulphate in the water.

Instead, or in addition, naturally, the separation of gypsum and other solids from the water may, if desired, be effected by flotation and/or centrifuging, and the flotation can be used to separate at least some of such solids from one another.

When the acid water to be treated contains heavy metal cations, e.g. transition metal cations such as $Fe_2^+$, $Fe_3^+$ or the like, the process may include the step, prior to passing the water through any said bed of calcium carbonate particles, and e.g. in a suitable reactor such as a mixed bed reactor upstream, relative to water flow, of the particles, of treating the water with an alkali, to cause precipitation of heavy metals therefrom in hydroxide form. This alkali may be CaO, $Ca(OH)_2$ or indeed $CaCO_3$ in fine powder form. Thus precipitation resists coating of the calcium carbonate particles in the fluidized bed with $Fe(OH)_3$ or particularly $Fe(OH)_2$, which coating can render the calcium carbonate in the fluidized bed inaccessible to hydrogen ions.

When the acid feed water contains $Fe^{2+}$ ions, the process may include the step, prior to passing the water being treated through any bed containing calcium carbonate, of oxidizing the $Fe^{2+}$ ions to $Fe^{3+}$ ions. Indeed, other heavy metal cations such as manganese cations, can similarly be oxidized, this oxidation in general reducing solubility of the hydroxides thereof. This is because the Applicant has found that, surprisingly and unexpectedly, when the acid feed water contains $Fe^{2+}$ ions, these ions tend to precipitate as $Fe(OH)_2$, at a pH of about 4-7, in a fashion such that a coating of $Fe(OH)_2$ is formed on the inventory particles, masking the calcium carbonate therein, and inhibiting the reaction of hydrogen ions with the calcium carbonate. In contrast, when the acid feed water contains $Fe^{3+}$ ions, these ions tend to precipitate as $Fe(OH)_3$, at a pH of about 3-4, in a fashion such that separate flocs of $Fe(OH)_3$ are formed, which do not coat the inventory particles, and have little, if any, inhibiting effect on the rate of reaction of sulphate ions with the calcium carbonate.

It is therefore desirable, as indicated above, to convert any $Fe^{2+}$ to $Fe^{3+}$ cations, e.g. before the pre-treatment with alkali to precipitate heavy metals, so that they precipitate at a low pH of 3 or somewhat higher during this pre-treatment. The $Fe(OH)_3$ flocs formed can instead pass through the bed, and although they will not form an inhibiting coating on the inventory, their formation will contribute to the acidity of the water. Preferably, however, this precipitate of $Fe(OH)_3$ is removed from the water, e.g. by settling or the like, water separated therefrom being at a pH of about 3-4 and being fed to the particles for further neutralization. This precipitation takes place in accordance with the reaction:

$$2Fe^{3+} + 6H_2O \rightarrow 2Fe(OH)_3 + 6H^+$$

This reaction, as indicated above, tends to re-acidify the water somewhat, prior to the neutralization by the inventory. This pre-treatment promotes the removal of all the $Fe^{2+}$ and $Fe^{3+}$ in the water upstream of the inventory, so that little, if any, $Fe(OH)_3$ precipitation takes place in the inventory. The method accordingly contemplates dosing the water with oxidizing agents, e.g. air, oxygen, $KMnO_4$, $Cl_2$, $O_3$, $H_2O_2$, $MnO_2$ or the like, in said mixed bed reactor, together with addition of the alkali, or upstream of the pre-treatment with alkali. Instead, biological oxidation may be employed for the purpose of oxidizing $Fe^{2+}$ ions to $Fe^{3+}$ ions, upstream of the pre-treatment with alkali, according to the reaction:

$$2Fe^{2+} + 2H^+ + \tfrac{1}{2}O_2 \rightarrow 2Fe^{3+} + H_2O.$$

For this biological oxidation, one or more species of microorganisms selected from, for example, *Thiobacillus thiooxidans T. neapolitanis* and *T. ferroxidans* can be employed at a pH of 0.8-3, e.g. 1.5-2.5, in a suitable reactor such as a mixed tank or mixed pond, or a packed tower, the water in the reactor optionally being oxygenated and having a metabolizable carbon source added thereto. Furthermore, biological oxidation can be effected by so-called wetland oxidation whereby the acid feed water is passed through a bed of growing plants in a wetland zone. These plants can also remove heavy metals from the water.

In this regard it should be noted that, if the water contains excessively high proportions of $Fe^{2+}$ and/or $Fe^{3+}$ ions associated with sulphate ions, as can be the case of certain biologically acidified mine waste water obtained e.g. from gold mines, so that up to 75% or more of the $SO_4^{2-}$ ions are associated with $Fe^{2+}$ or $Fe^{3+}$ ions, and the balance thereof are associated with acid $H^+$ ions, the process of the present invention is suitable for the treatment thereof, provided $Fe^{2+}$ ions are converted to $Fe^{3+}$ ions and preferably precipitated as $Fe(OH)_3$ which is removed prior to feeding the water through the inventory. It is further to be noted that, in principle, other heavy metal cations can be removed from the water in analogous fashion to that described above for removing $Fe^{2+}$ or $Fe^{3+}$ ions, i.e. by oxidation, optionally biologically, and precipitation as the hydroxide prior to the treatment of the water in the fluidized bed.

Naturally, as the precipitation of $Fe(OH)_3$ in the inventory does not affect the rate of reaction of hydrogen ions with the calcium carbonate unaccceptably, the pretreatment with alkali to precipitate $Fe(OH)_3$ before the water passes through the inventory can be omitted, provided $Fe^{2+}$ ions are oxidized to $Fe^{3+}$ ions. In this case $Fe(OH)_3$ merely forms as flocs at a pH of 3-4 in the inventory and can join the gypsum in the upper fluidized layer of crystals, after which it can be separated from the treated water after it is eluted with the crystals from the inventory. This option can be employed when the crystals produced are to be discarded and not recovered as a by-product, the $Fe(OH)_3$ conveniently being discarded with the crystals after optionally being separated therewith from the product water. Instead, the $Fe(OH_3)$ can be separated from the water by settling or filtration, prior to crystals precipitation.

It is expected that a major application of the process of the present invention will be in the treatment of certain industrially produced effluent waste waters, such as those produced by explosives manufacturers or uranium refiners. Waste waters from uranium refiners can have pH's of less than 2.5. In such cases, i.e. when the acid feed water has a pH of less than 2.5, the method may include the step, prior to the precipitation of the heavy metals therefrom, of increasing the pH of the water to at least 2.5. Such waters can be treated in a fluidized bed containing calcium carbonate to increase the pH to 2.5; they can then be dosed, as described above, with alkali to increase pH sufficiently (e.g. to a value of 3-4) to precipitate $Fe(OH)_3$, preferably with prior oxidation of $Fe^{2+}$ to $Fe^{3+}$ ions as described above, and followed by further pH increase in one or more further, similar, fluidized beds containing the calcium carbonate inventory.

In the case where the water to be treated contains manganese ions in the form of $Mn^{2+}$ ions, and when dolomite is used to provide the calcium carbonate inventory in the fluidized bed, the process of the present invention can, in principle at least, reduce the concentration of these $Mn^{2+}$ ions by the reaction thereof with the magnesium carbonate in the fluidized bed inventory according to the reaction:

$$CaMg(CO_3)_2 + Mn^{2+} \rightarrow MnCO_3 + CaCO_3 + Mg^{2+}$$

The $MnCO_3$ produced is substantially less soluble in water than the $MgCO_3$ consumed, resulting in the precipitation of $MnCO_3$ and the release of $Mg^{2+}$ ions into the water. This is beneficial, as environmentally acceptable water is usually permitted to contain substantially higher concentrations of $Mg^{2+}$ ions (e.g. about 100 mg/l) than $Mn^{2+}$ ions (e.g. about 0.5 mg/l). Any residual $Mn^{2+}$ ions in the water can, if desired, be removed by oxidising the $Mn^{2+}$ ions to $Mn^{4+}$ to obtain a precipitate in the form of $MnO_2$. This oxidation can be effected by $Cl_2$ at a pH of about 7, according to the reaction:

$$Mn^{2+} + Cl_2 + 2H_2O \rightarrow MnO_2 + 2HCl + 2H^+$$

Instead, at a pH of greater than 9.5, the oxidation can be effected by using oxygen (treatment with air, $O_2$, $O_3$, $H_2O_2$ and/or $KMnO_4$), according to the reaction:

$$2Mn^{2+} + O_2 + 2H_2O \rightarrow 2MnO_2 + 4H^+$$

These oxidizing reactions require relatively high pH's as indicated above, which can be obtained, as described above, by treating the water issuing from the fluidized bed with e.g. CaO, $Ca(OH)_2$ or NaOH. The oxidizing agent employed therefor can be introduced into the, or the last, fluidized bed, or downstream thereof.

Any $MnCO_3$, $MnO_2$ or indeed any $Fe(OH)_3$ produced in the inventory can be separated from the water being treated together with the gypsum, when the gypsum is separated from the water as described above, and, if desired, they can be at least partially separated from one another by flotation, the $MnO_2$ and $MnCO_3$, in addition to the $CaSO_4 \cdot 2H_2O$ and $CaSO_3$ being potentially valuable by-products, or, at worst, environmentally acceptable waste products if they are dumped to waste in solid form.

With regard to the utility of the present invention, it should be noted that calcium carbonate is, in fully mechanically mixed bed reactors, difficult to use to treat acid waste waters. The neutralization reaction is slow, and much of the calcium carbonate can be lost with the treated stream. Using the fluidized bed process of the present invention, however, promotes full and effective use of all the calcium carbonate fed to the process, with reduced danger of such loss. Furthermore, the large surface area provided by the particles of calcium carbonate inventory in the fluidized bed, which are constantly rubbed free of any gypsum produced, leads to an acceptably rapid rate of reaction Full advantage can accordingly be taken of the relatively low cost of limestone or dolomite as reagents, compared e.g. with CaO, $Ca(OH)_2$, NaOH or the like, which are otherwise often employed for pH reduction of acid waters to improve the quality thereof.

The invention will now be described, by way of example, with reference to the accompanying schematic drawings, in which.

Figure 1:
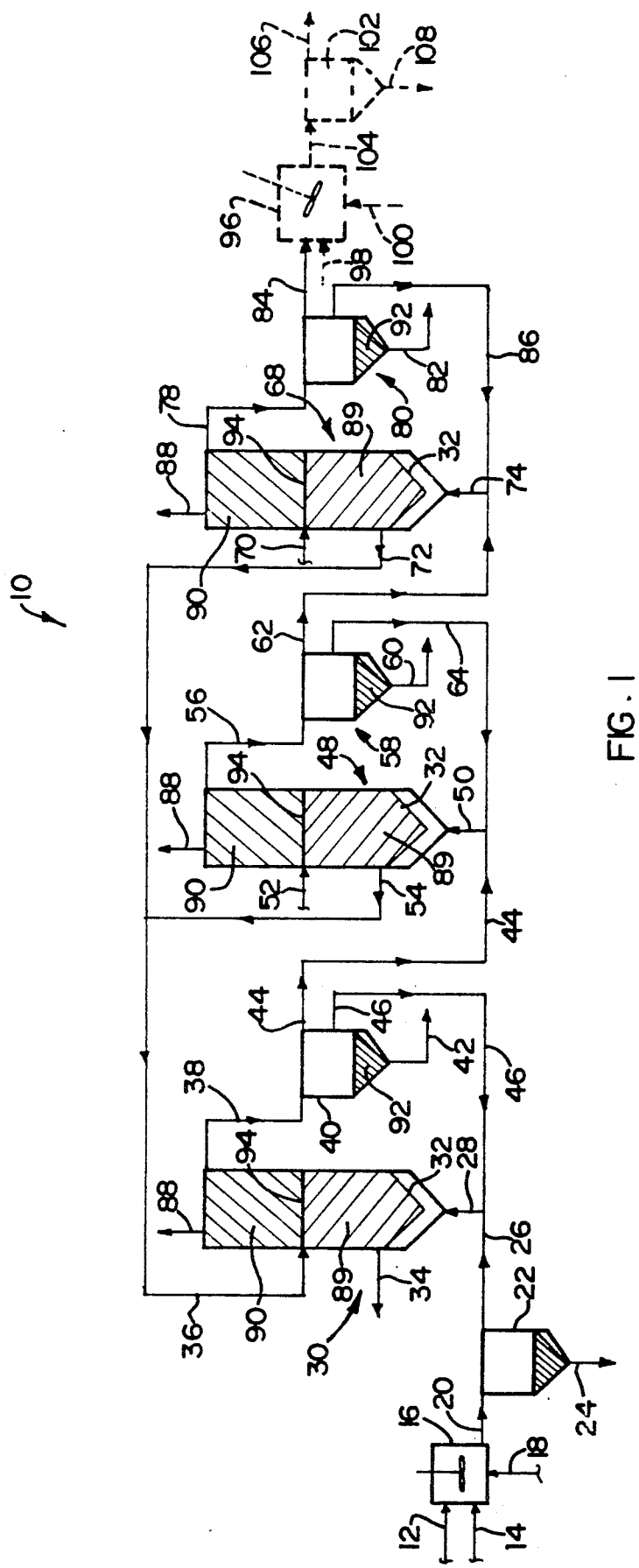
FIG. 1 shows a flow diagram of the present invention.

In FIG. 1, a schematic flow diagram of the process of the present invention is generally designated by reference numeral 10. The flow diagram 10 is selected to show a representative embodiment of the process, and to illustrate a number of optional features of the process. It should be appreciated that, in practice, a number of features illustrated in FIG. 1 may frequently be omitted, if they are not required.

In the drawing, a raw water feed line 12 and an alkali feed line 14 are shown feeding into a fully mixed tank 16 constituting an alkali dosing stage. An oxidizing agent feed line 18 is also shown feeding into the tank 16. A flow line 20 leads from the tank 16 to a settling stage in the form of a settling tank 22 having a solids discharge line 24 and a liquid discharge line 26. The liquid discharge line 26 is shown feeding into a feed line 28 for a fluidizing stage constituted by a fluidized bed reactor 30 provided with the usual fluid distributor 32. The reactor 30 has a spent inventory discharge line 34 and a solids inventory feed line 36, together with a liquid discharge line 38. The liquid discharge line 38 leads to a settling stage constituted by a settling tank 40.

The settling tank 40 has a solids discharge line 42 and a liquid discharge line 44. A liquid recirculation line 46 leads from the settling tank 40 and joins the flow line 26 feeding into the flow line 28.

The flow line 44 leads to a further fluidized bed reactor 48, and feeds into the reactor 48 via flow line 50. The arrangement of the reactor 48 is substantially similar to that of the reactor 30, in that it has a solids inventory feed line 52 and a spent inventory solids discharge line 54 which leads into the flow line 36. The reactor 48 has a liquid discharge line 56 which is shown leading into a settling stage in the form of a settling tank 58 having a solids discharge line 60 and a liquid discharge line 62. A recirculation flow line 64 leads from the settling tank 58 into the flow line 50 feeding into the reactor 48.

A further, substantially similar, fluidized bed reactor 68 is shown arranged in series, with regard to the flow of water being treated, downstream of the reactor 48. This again has a solids inventory feed line 70 and a spent solids inventory discharge line 72 which feeds into flow line 36. It has a liquid feed line 74 fed by the flow line 62 from the settling tank 58. The reactor 68 has a liquid discharge line 78.

Liquid discharge line 78 leads to a settling tank 80 which has a solids discharge line 82, a liquid discharge line 84 and a recirculation discharge line 86 leading into the flow line 74.

Each of the reactors 30, 48 and 68 is shown with a gas outlet flow line, designated 88.

A representative process in accordance with the present invention will now be described with reference to the flow diagram 10.

The process is for treating an acid waste water containing $Fe^{2+}$ and $Fe^{3+}$ cations, and $SO_4^{2-}$ anions, having a pH of somewhat less than 2.5 and a $SO_4^{2-}$ ion content of somewhat higher than 2500 mg/l.

In accordance with the process, a raw water feed is fed along flow line 12 into the mixing tank 16. At the same time, a suitable alkaline material, in the case of this example $Ca(OH)_2$, is fed into the tank 16 via flow line 14, while a suitable oxidizing agent, in this example $H_2O_2$, is fed into the tank 16 via flow line 18. Sufficient $Ca(OH)_2$ is fed to raise the pH at least to about 3, i.e. above 2.5.

In the tank 16 the $H_2O_2$ reacts with ferrous ions to produce ferric ions in accordance with the following reaction:

$$4Fe^{2+} + 2H_2O_2 + 4H^+ \rightarrow 4Fe^{3+} + 4H_2O$$

Sufficient $H_2O_2$ is fed along flow line 18 to ensure that all the ferrous ions are converted to ferric ions in the tank 16. At the same time, calcium hydroxide from the feed line 12 reacts with the ferric ions produced in the acid environment in the tank 16, when the pH reaches about 3, in accordance with the reaction:

$$3Ca(OH)_2 + 2Fe^{3+} \rightarrow 2Fe(OH)_3 + 3Ca^{2+}$$

The ferric hydroxide forms a precipitate, and the treated water from the tank 16, together with this ferric hydroxide, flows from the tank 16 along flow line 20 to the settling tank 22, where it settles and is discharged as a solid to waste along flow line 24. Water from the tank 22 which has been separated from ferric hydroxide leaves tank 22 along flow line 26.

If desired, the ferric hydroxide solid discharge from tank 22 along flow line 24 may be dewatered, the solid ferric hydroxide being recovered as a by-product or dumped to waste and the water separated therefrom being returned to the flow line 26.

Flow line 26 feeds via flow line 28, as a fluidizing fluid, into the fluidized bed reactor 30 below the distributor 32. Solids inventory is simultaneously fed, in this example continuously, into the reactor 30 via flow line 36. Spent solids inventory is discharged to waste and dumped from the reactor 30 via flow line 34, after optional dewatering, the water separated therefrom being returned, e.g. to flow line 26.

From the description which follows hereunder, it will be understood that the solids inventory fed to reactor 30 via flow line 36 contains a relatively low proportion of calcium carbonate, and the solids inventory leaving the reactor 30 via flow line 34 has substantially no calcium carbonate in it whatsoever.

In the reactor 30, the calcium carbonate in the solids inventory in the reactor, which solids inventory is designated by reference numeral 89, acts to neutralize water entering the reactor via flow line 28 in accordance with the reaction:

$$CaCO_3 + 2H^+ \rightarrow Ca^{2+} + CO_2 + H_2O$$

The carbon dioxide produced issues from the reactor 30 via flow line 88, and can be recovered as a by-product of the process.

As the raw water contains sulphate ions, these sulphate ions react with the calcium ions liberated by the neutralization, to form a precipitate of gypsum or $CaSO_4 \cdot 2H_2O$ crystals. These crystals form a fluidized layer, designated by reference numeral 90, in the reactor 30, above the fluidized solids inventory 89.

Partially neutralized water issues from the reactor 30, together with eluted gypsum crystals, via flow line 38 and the flow along flow line 38 enters the settling tank 40 where the gypsum is settled as shown at 92, together with such other solid materials, e.g. residual ferric hydroxide, as are in the water.

The solids settled in the tank 40 issue along flow line 42 to a dewatering stage (not shown), in this example a filtration stage, where the gypsum is separated as a by-product, separated water being returned to flow line 44.

Water issuing from the tank 40 passes along flow line 44, except for a proportion thereof which is recirculated along flow line 46 which feeds into flow line 28, to provide a sufficient upward water flow rate in the reactor 30 for the fluidization. This flow rate is no more than is sufficient reliably to fluidize the solids inventory 89 in the reactor 30.

It will be appreciated that, as the use of calcium hydroxide fed along flow line 14 to tank 16 is expensive, no more calcium hydroxide will be fed along flow line 14, than is necessary to precipitate all the ferric ions in the raw water as ferric hydroxide in the tank 16. This occurs at a pH at or slightly above 3. Furthermore, as indicated above, the inventory feed along flow line 36 to the reactor 30 will contain relatively little calcium carbonate, as the purpose of the reactor 30 is to ensure that all the calcium carbonate fed to the process is consumed. There will accordingly not be a substantial pH increase in the water being treated as it passes through the reactor 30, so that this water is still undesirably acid for release to the environment.

The water from flow line 44 accordingly passes into the fluidized bed reactor 48 for further pH increase. The water enters the reactor 48 via flow line 50 below separator 32, and fresh calcium carbonate-containing inventory is fed to the reactor 48 along flow line 52, in this example in the form of dolomitic limestone, comprising about 80–90% by mass carbonate as calcium carbonate and magnesium carbonate, the magnesium carbonate comprising the minor proportion thereof, so that the carbonate is present as a major proportion of $CaCO_3$ and a minor proportion of $CaMg(CO_3)_2$.

In the reactor 48 the calcium carbonate in the inventory, again designated 89, reacts in similar fashion to that described above for the reactor 30, to produce carbon dioxide which issues along flow line 88 and gypsum which forms as the fluidized layer 90.

The rate of inventory feed along flow line 52 is selected so that calcium carbonate is provided at a rate, stoichiometrically based, sufficient to neutralize to a pH of 7 the water entering the reactor 48 along flow line 44 without a stoichiometric excess of calcium carbonate. Owing to the production of carbon dioxide and the presence of carbonic acid in the reactor 48, however, this neutralization cannot achieve a pH much higher than about 5.5–6. Accordingly, not all the calcium carbonate fed to the reactor 48 can be consumed As there is a continuous feed of fresh inventory along flow line 52, there is a corresponding continuous purging of spent inventory along flow line 54 which, as described above, contains a residual proportion of calcium carbonate. Flow line 54 feeds into flow line 36 and then into reactor 30 where said residual calcium carbonate is reacted as described above. As indicated above, the purpose of reactor 30 is to ensure that all the calcium carbonate in the spent inventory from the reactor 48 is consumed In a fashion similar to the water from reactor 30, the neutralized water from reactor 48 issues along flow line 56 to settling tank 58 where settled solids 92 are discharged along flow line 60 for dewatering in a fashion similar to that described above to settling tank 40. Once again there is recirculation of clarified water from settling tank 58 along flow line 64 via flow line 50 to the reactor 48, to ensure sufficient upflow for reliable fluidization in the reactor 48.

Product water issues from settling tank 58 along flow line 62 to reactor 68.

The reactor 68 is provided to increase the pH of the process water as high as possible, so that it issues finally at a pH in the region of 5.6–7.6, controlled only by the presence of carbon dioxide in the reactor 68 and as close as possible to 7.6.

Accordingly, flow from flow line 62 enters the reactor 68 below its separator 32, along flow line 74, while dolomitic lime inventory feed is fed to the reactor 68 along flow line 70, spent inventory issuing from the reactor 68 along flow line 72 which feeds into flow line 36 for use in the reactor 30. Carbon dioxide issues along flow line 88 and treated water along flow line 78.

Once again, the water from flow line 78 is clarified, by passing into settling tank 80, settled solids 92 issuing along flow line 82 for dewatering as described above with reference to settling tank 40. Product water issues along flow line 84, and a proportion of the clarified water from the tank 80 is recirculated along flow line 86 to flow line 74, to provide sufficient upflow in the reactor 68 for reliable fluidizing.

It is possible that the raw water fed along flow line 12 in this example can contain $Mn^{2+}$ cations. In this case it is believed that, in each of the reactors 30, 48 and 68, these $Mn^{2+}$ cations can in principle possibly react with magnesium carbonate in the dolomitic limestone according to the reaction:

$$CaMg(CO_3)_2 + Mn^{2+} \rightarrow MnCO_3 + CaCO_3 + Mg^{2+}$$

The $MnCO_3$ is relatively insoluble, and the major proportion thereof can in principle precipitate in the reactors, the precipitate, being in finely divided form, being eluted from the reactors together with the gypsum, and being settled together with the gypsum in the settling tanks 40, 58 and 80, so that this $MnCO_3$ issues from the process, in each case, together with the gypsum and together with such residual ferric hydroxide as is not settled in the tank 22.

If desired, $MnCO_3$ and/or $Fe(OH)_3$ can be separated from the gypsum and/or from each other, e.g. by flotation in flotation stages (not shown) associated respectively with the dewatering stages which are in turn associated with said settling tanks 40, 58 and 80.

It should be noted with regard to the reactors 30, 48 and 68, that the respective inventory feed lines 36, 52 and 70 are arranged to feed into said reactors 68 at substantially the same elevation as the interfaces 94 between the fluidized inventory 88 and the fluidized layer of gypsum 90.

As any manganese carbonate produced is not entirely insoluble, product water issuing along flow line 84 can contain $Mn^{2+}$ ions, while being at a pH of 5.5–7.6. In this example these $Mn^{2+}$ ions can be removed from the water by an alkali dosing/oxidation stage, shown in broken lines at 96 in the form of a stirred tank. In this example calcium hydroxide is fed into the tank 96 along flow line 98, while an oxidizing agent in the form of air is fed into the tank 96 via flow line 100. The calcium hydroxide added is sufficient to raise the pH of the water from flow line 84 which enters the tank 96, to a pH of above 9.5. At this pH the $Mn^{2+}$ ions can be oxidized by the oxygen in the air accordance with the reaction:

$$Mn^{2+} + 2H_2O \rightarrow MnO_2 + 2H^+$$

The $MnO_2$ would be insoluble and form a fine precipitate, while the calcium hydroxide, in further neutralizing and raising the pH of the process water, can react according to the following reaction:

$$Ca(OH)_2 + H_2SO_4 \rightarrow CaSO_4 + H_2O.$$

Further gypsum can thus be produced and this gypsum, in fine crystal form together with the $MnO_2$, can be finally separated from the process water in a settling tank 102 fed by flow line 104 from tank 96. Water, from which substantially all the iron ($Fe^{2+}$ and $Fe^{3+}$) cations and possibly some of the manganese ($Mn^{2+}$) cations have been removed, and which has been neutralized to a pH of about 9–10 finally issues from the tank 102 via flow line 106, for release to the environment.

Solids settled in the tank 102 pass along flow line 108 to a dewatering stage where any $MnO_2$ and the gypsum are dewatered as described hereinabove with reference to solids issuing from tank 40 along flow line 42. Water separated therefrom can be returned to flow line 108. If it is desired to obtain the $MnO_2$ as a by-product, this can be separated from the gypsum by flotation in a flotation stage (not shown)

Figure 2:
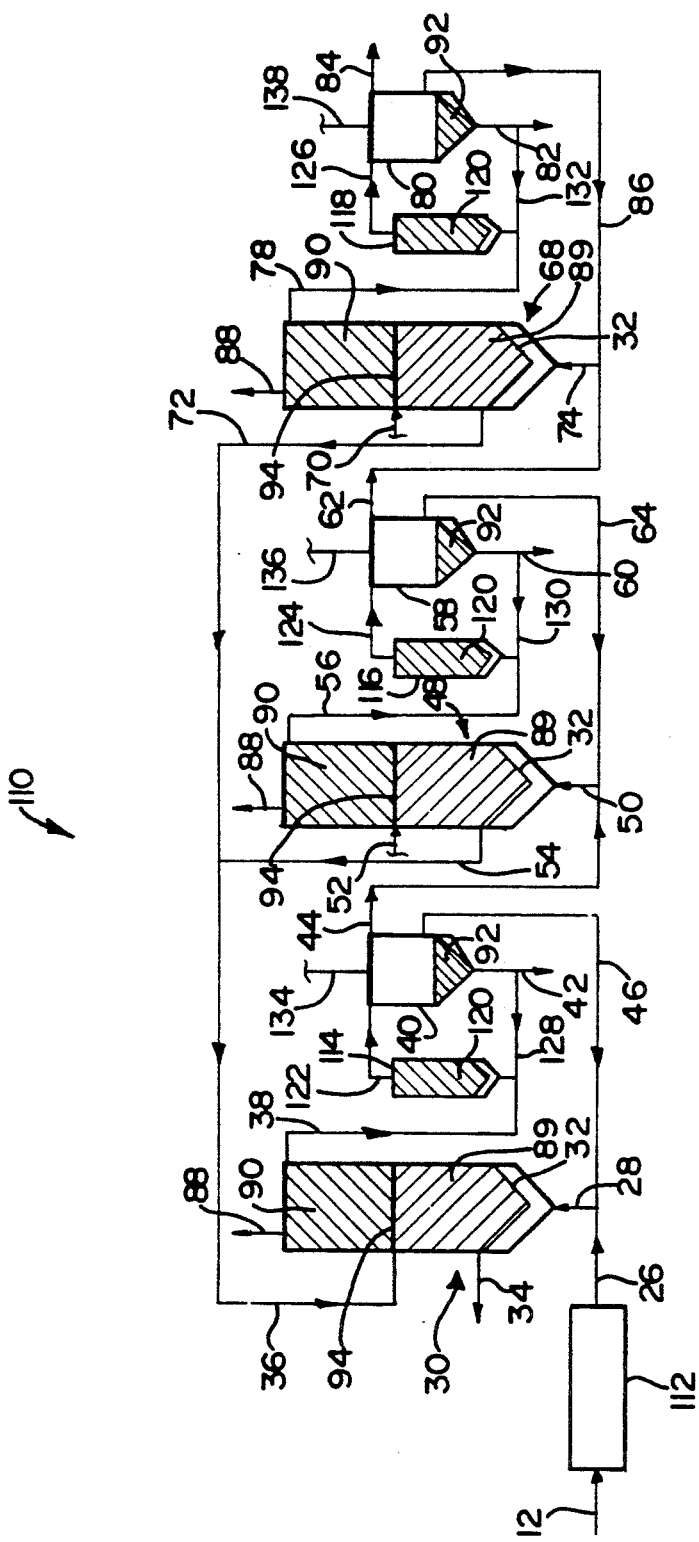
FIG. 2 shows a modification of FIG. 1.

FIG. 2 shows a modification of the flow diagram 10 of FIG. 1, and this modification is generally designated 110. Unless otherwise specified, the same reference numerals refer to the same parts as in FIG. 1.

There are two principal differences between the flow diagram of FIG. 1 and that of FIG. 2. The first is that the fully mixed tank 16 of FIG. 1 and feed lines 14 and 18 leading thereto are omitted, together with the flow line 20. Instead, a biological oxidation stage such as a reactor 112 is fed by the feed line 12 and feeds into the line 26.

The second is that, between each fluidized bed reactor (respectively 30, 48 and 68) and its associated respective settling tank (respectively 40, 58 and 80), there is provided a crystallization stage in the form of a fluidized bed (respectively 114, 116 and 118), containing a gypsum crystal inventory 120.

The discharge line 38 of the reactor 30 feeds into the crystallization stage 114, which in turn feeds via flow line 122 to settling tank 40. Similarly, flow line 56 from reactor 48 feeds to crystallization stage 116 while flow line 78 from reactor 68 feeds to crystallization stage 118; and stage 116 feeds via flow line 124 to tank 58 while stage 118 feeds via flow line 126 to tank 80.

A seed crystal feed line 128 feeds from solids discharge line 42 from tank 40 into flow line 38. Similarly seed crystal flow lines 130 and 132 feed respectively from solids discharge lines 60 and 82 into flow lines 56 and 78 respectively. Organic flocculants dosing lines 134–138 are shown respectively feeding into tanks 40, 58 and 80.

Furthermore, the alkali dosing stage 96, settling tank 102 and associated flow lines 98, 100 and 104–108 of FIG. 1 are omitted, the flow diagram 110 of FIG. 2 being specifically intended for water having no $Mn^{2+}$ cations, and essentially only $Fe^{2+}$ and $Fe^{2+}$ cations as heavy metal cations therein. Furthermore, it is not intended to recover gypsum as a by-product.

The process of the present invention, as carried out in the flow diagram of FIG. 2, is broadly similar to that of FIG. 1, except, once again, for two major differences, one being that the chemical oxidation and ferric hydroxide precipitation in tank 16 and ferric hydroxide settling in tank 22 are replaced by a biological oxidation using *T. ferrooxidans* at a pH of 1.5–2.5 in the reactor 112. The other is that crystallization of gypsum is promoted in each of the fluidized beds 114–118.

Accordingly, $Fe^{3+}$ ions precipitate as $Fe(OH)_3$ flocs in the reactor 30, and to a lesser extent in the reactors 48 and 68, the flocs joining the gypsum crystals in the fluidized layers 90. Partially neutralized water from the reactor 30 with eluted gypsum crystals and said $Fe(OH)_3$ flocs, passes along flow line 38 to fluidized bed 114. In fluidized bed 114, whose inventory 120 is principally gypsum crystals, further crystallization of gypsum from the water is promoted, the inventory crystals acting as seed crystals. In the tank 40, a suitable organic flocculant is used to flocculate $Fe(OH)_3$ flocs and gypsum crystals fed to the tank 40 along flow line 122 from fluidized bed 114. A proportion of the settled solids 92 passing along flow line 42 is recirculated via flow line 128 to fluidized bed 114 to provide seed gypsum crystals Water flowing from reactor 48 along flow line 56 and from reactor 68 along flow line 78, with $Fe(OH)_3$ flocs and gypsum crystals, is dealt with in similar fashion respectively by fluidized beds 116 and 118 and their respective tanks 58 and 80, product water issuing directly from tank 80 via line 84, without any $Mn^{2+}$ ion removal.

It is an advantage of the invention that, particularly as described with reference to the drawings, it provides a process for the improvement of the quality of acid waste waters containing sulphate ions and also the metal cations $Fe^{2+}$, $Fe^{3+}$ and possibly $Mn^{2+}$ ions. Carbon dioxide, gypsum, manganese carbonate, manganese dioxide and ferric hydroxide are produced as at least potentially usable by-products, which, on the other hand, if desired, are environmentally acceptable for dumping to waste. In particular, it is an advantage of the invention that it provides a process whereby relatively inexpensive limestone, dolomite or dolomitic limestone can be employed to increase the pH of such waters, at reduced cost compared with the use of certain other alkaline materials such as CaO, $Ca(OH)_2$ and NaOH which can be used for the same purpose.

Finally, it should be noted, with reference to FIG. 1, that, instead of separating eluted gypsum crystals in the settling tanks 40, 58 and 80, gypsum crystals may be withdrawn directly from the layers 90 via separate flow lines to similar settling tanks, from which separated water can be returned to the process Instead of feeding fresh limestone into both reactors 48, 68, fresh limestone can be fed only to reactor 68, spent limestone from reactor 68 being fed to reactor 48. Finally, if the raw water is sufficiently acid, the oxidizing and settling stages respectively in the tanks 16 and 22 of FIG. 1 can be moved downstream, to a suitable position between two of the reactors 30, 48, 68 where the water has an appropriate pH therefor.

Although the invention with reference to the drawings has been described with reference to an acid feed water containing sulphate ions, it will be appreciated that the process of the invention can be carried out in substantially analogous fashion when the acid water contains sulphite ions instead of or in addition to sulphate ions.

What is claimed is:

1. In a process for the treatment of acid water containing anions selected from the group consisting of sulphate anions and sulphite anions, to reduce the concentration of said ions therein, the process being continuous and including the step of feeding said acid water into at least one bed of particles comprising calcium carbonate, the water fed to each bed passing through the bed where it consumes the calcium carbonate of the particles, which consumption causes an increase in the pH of the water, said anions in the water reacting with calcium ions from the calcium carbonate according to a reaction selected from:

$$H_2SO_4 + CaCO_3 \rightarrow H_2O + CaSO_4 + CO_2; \text{ and}$$

$$H_2SO_3 + CaCO_3 \rightarrow H_2O + CaSO_3 + CO_2,$$

and a product water being produced with a pH which is higher than that of the acid feed water, the improvement whereby the water fed to at least one said bed is caused to fluidize that bed, thereby to cause constant rubbing between and attrition of the calcium carbonate particles of the fluidized bed, to resist any build-up of a coating on the particles, and to promote rapid reaction of the calcium ions with said sulphate and sulphite anions.

2. A process as claimed in claim 1, in which the acid water has a sulphate content of above 2000 mg/l, calcium sulphate precipitating as gypsum crystals.

3. A process as claimed in claim 2, in which a proportion of the water which has passed through each bed is recirculated to the water fed to said bed, the recirculated water being passed through said bed, together with the acid feed water, to assist in fluidizing the bed.

4. A process as claimed in claim 2, in which the particles in each bed are selected from limestone particles, dolomite particles and mixtures thereof.

5. A process as claimed in claim 4, which includes feeding calcium carbonate-containing particles to the bed, at least intermittently, and purging spent particles from the bed, at least intermittently, when calcium carbonate therein has been consumed.

6. A process as claimed in claim 5, which includes passing the water being treated through a plurality of fluidized beds arranged in series, feeding fresh calcium carbonate-containing particles into the last bed of the series, using spent particles purged from each bed other than the first bed in the series as a particle feed to the preceding bed in the series and discarding spent particles from the first bed in the series containing substantially no calcium carbonate.

7. A process as claimed in claim 1, in which the acid feed water contains heavy metal cations, the process including the step, prior to passing the water through any said bed of calcium carbonate particles, of treating the water with an alkali, to cause precipitation of heavy metals therefrom in hydroxide form, to resist any build-up of a coating of heavy metal compounds on the particles, and to promote said rapid reaction.

8. A process as claimed in claim 1, in which the acid feed water contains $Fe^{2+}$ ions, the process including the step, prior to passing water being treated through any bed of particles containing calcium carbonate, of oxidizing the $Fe^{2+}$ ions to $Fe^{3+}$ ions, to promote formation of flocs of $Fe(OH)_3$ in the bed and to resist the formation of $Fe(OH)_2$ coatings on the particles.

9. A process as claimed in claim 7, in which the acid feed water has a pH of less than 2.5, the method including the step, prior to the precipitation of heavy metals therefrom, of increasing the pH of the water to at least 2.5.

10. A process as claimed in claim 1, in which the water fed to each bed of particles comprising calcium carbonate to fluidize it is fed at a selected rate such that the water fed to the bed elutes and separates from the bed any crystals of gypsum and calcium sulphite formed in the bed by said reactions, said crystals being carried by the water to a position located, with regard to water flow, downstream from the fluidized bed of particles, whereby crystals form a bed which is also fluidized by the water, the crystals acting as seed crystals therein to promote further crystallization of the material of the crystals.

11. A process as claimed in claim 10, in which the fluidized particles form a bed in the form of a layer, the fluidized bed of crystals forming a further layer above said layer of particles in a common reactor.

* * * * *